Figure 1:
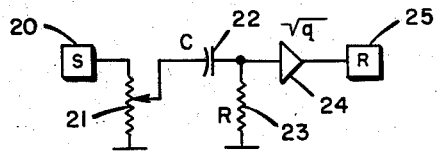

Feb. 10, 1959 R. J. RUNGE 2,872,996
SEISMIC WAVELET CONTRACTION
Filed Oct. 17, 1957

INVENTOR.
RICHARD J. RUNGE
BY Newell Pottoy
ATTORNEY

United States Patent Office 2,872,996
Patented Feb. 10, 1959

2,872,996

SEISMIC WAVELET CONTRACTION

Richard J. Runge, La Habra, Calif., assignor to Pan American Petroleum Corporation, Tulsa, Okla., a corporation of Delaware Application October 17, 1957, Serial No. 690,786

3 Claims. (Cl. 181—.5)

This invention relates to seismic geophysical surveying and is directed to a method and apparatus for improving the resolution of overlapping seismic wave forms. More specifically, it is directed to a method and apparatus for contracting or shortening the seismic wavelets which form a wavelet complex when two or more of such wavelets occur so closely together in time that they cannot be separately identified.

The wave forms of typical seismic wavelets and their resolution by contraction have been thoroughly discussed by Ricker in Geophysics for October 1953, volume XVIII, page 769. It is there shown that the typical wavelet spectrum of wave amplitude as a function of the frequency $f$ has the form $$\frac{f^2}{f_1^2} e^{-\frac{f^2}{f_1^2}}$$

where $f_1$ is the peak frequency of the wavelet spectrum. It is also shown by Ricker that the wavelet contractor is simply an amplifying and filtering system having an amplitude response characteristic $$e^{+\frac{f^2}{f_a^2}}$$

where $f_a$ is a characteristic of the system. Passing the wavelet through the contractor system does not alter the shape of the wavelet spectrum but merely shifts its peak frequency to a higher value, which corresponds to a narrower wavelet breadth.

It was found experimentally that the maximum practical contraction of wavelet forms was limited to a factor of about 0.7. If a greater degree of contraction than this was attempted, distortions introduced by the phase and amplitude characteristics of the contractor system obscured the results.

It is a primary object of the present invention to provide a method and apparatus for contracting seismic wavelets which avoid certain sources of distortion present in the prior-art systems. A more specific object is to provide a novel method and apparatus for approximating the action of the theoretical seismic wavelet contractor with a substantially zero phase distortion. A still further object is to provide such a novel method and apparatus having a possible contraction factor smaller than 0.7 due to the substantial elimination of phase distortion. Other and further objects, uses, and advantages will become apparent as the description proceeds.

Briefly stated, the foregoing and other objects are accomplished by an analog system which approximates the exponential characteristic of the wavelet contractor by reproducing a number of the terms of the infinite series into which the exponential may be expanded. Each term of the series is approximated by one of a number of successive steps, and the summation of the desired number of terms is approximated by adding together the results of the individual steps.

More specifically stated, the wavelet contractor system is one in which the amplitude response is of the form $e^{Kw^2}$, and having either a zero or a certain linear phase characteristic throughout the entire range of frequencies of interest. The series expansion of the exponential is $$e^{Kw^2} = 1 + \frac{Kw^2}{1} + \frac{(Kw^2)^2}{1 \cdot 2} + \frac{(Kw^2)^3}{1 \cdot 2 \cdot 3} + \frac{(Kw^2)^4}{1 \cdot 2 \cdot 3 \cdot 4} + \frac{(Kw^2)^5}{1 \cdot 2 \cdot 3 \cdot 4 \cdot 5} + \cdots$$

where K is a constant of the system representative of the degree of contraction and $w$ is frequency in radians per second. The system of the present invention is designed and operated so as to approximate as many terms of this series as are necessary to give $e^{Kw^2}$ to the desired accuracy.

This is done by passing the complex seismic signals to be contracted through an electrical system having a transfer function of the form $\sqrt{Kw}$ and recording the resultant waves as a new phonographically reproducible trace. The process is then repeated a number of times, each time starting with the just previously recorded trace. Thus, the transfer function of the first two passes through the system is $(\sqrt{Kw})^2$ or $Kw^2$, the next two passes produce a transfer function $(Kw^2)^2$, the third pair $(Kw^2)^3$, and so on. By "phonographically reproducible," as contrasted with "photographically reproducible," for example, is meant a recording system or process in which a transducing device responsive to an electric wave modulates in corresponding fashion a trace on a recording medium, or vice versa, transforms a recorded trace back into an electric wave of corresponding form.

The phase characteristics of the system are canceled out by making the playbacks of the reproducible traces in pairs, one forward and one in reverse. By this operation, phase shifts which are introduced by the electrical system in one playback are exactly compensated by the opposite shifts produced by the same system during the next playback when the recorded trace is reproduced in reverse. It does not matter which playback of a pair is performed first, as long as the other is opposite to it.

The numerical constants of the various terms of the series are introduced by attenuation preceding the various playbacks. A summation of selected ones of the recorded and played-back traces gives the final result desired.

Figure 2:
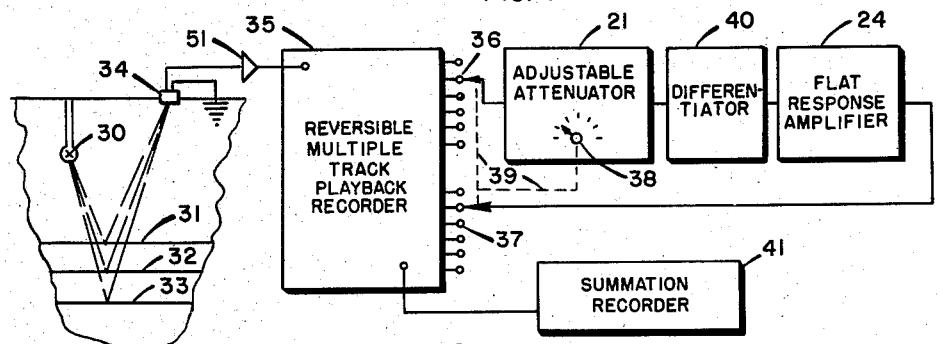
Figure 3:
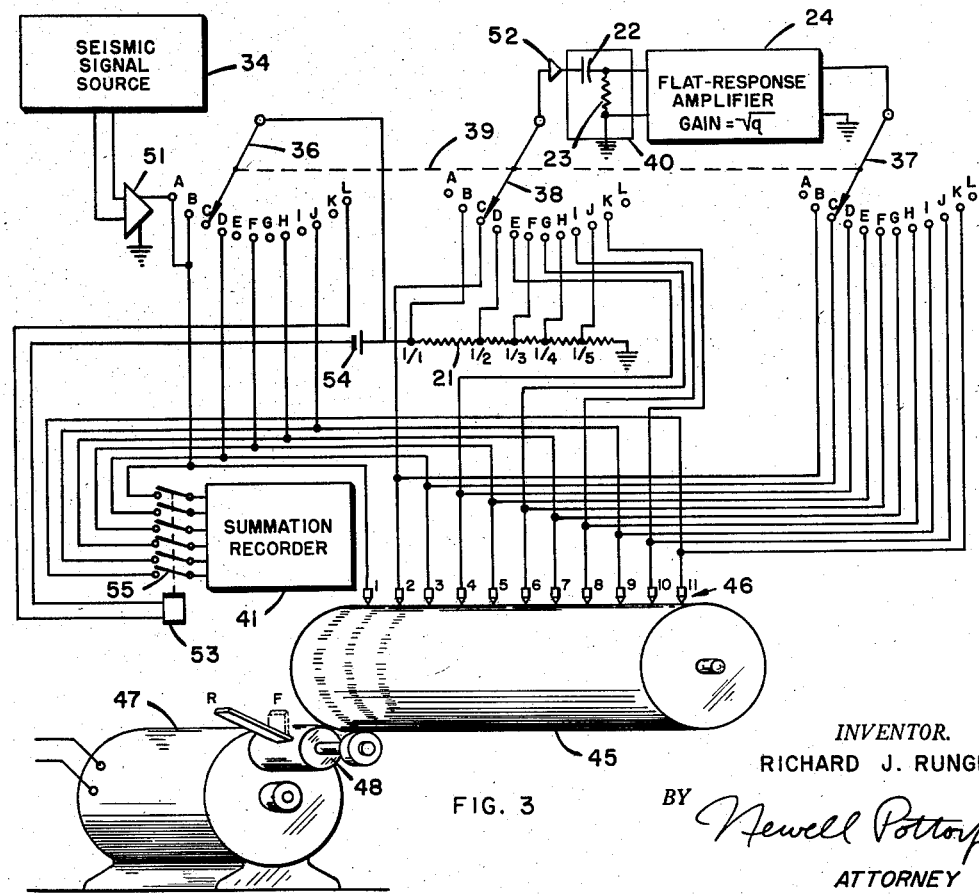

This will be better understood by reference to the accompanying drawings forming a part of this application and illustrating a typical embodiment of the invention. In these drawings, Figure 1 is a diagrammatic illustration of a portion of the system showing how each series term is approximated;

Figure 2 is a block diagram of the complete system in operation for field recording; and Figure 3 is a detailed circuit drawing of a typical embodiment of the invention.

Referring now to the drawings in detail and particularly to Figure 1, this figure shows the basic circuit employed to simulate each of the successive terms of the series expansion for $e^{Kw^2}$. Inspection of the series shows that each term after the first is obtained from the previous term by multiplication by the factor $$\frac{Kw^2}{n}$$

The basic circuit of Figure 1 for performing this multiplication consists of a signal source 20, an attenuator 21 for introducing the factor $$\frac{1}{n}$$

a condenser 22 of capacitance C shunted to ground by a resistor 23 of resistance R ohms, the voltage across the resistor being applied to the input of a flat-response amplifier 24 of gain equal to $\sqrt{q}$, which amplifier drives a recording unit 25.

For an angular frequency $w$ this resistor-condenser combination has a transfer function $$\frac{RwC}{(1+R^2w^2C^2)^{1/2}}$$

This expression is the factor by which the voltage from the attenuator 21 is multiplied or altered as it reaches the input of the amplifier 24. By designing this RC circuit so that over the entire usable frequency range $$RwC \ll 1$$

the denominator approaches unity, and to a very good approximation the transfer function is simply the expression $RwC$.

Letting $\sqrt{q}$ represent the gain of the amplifier 24 and the expression $$e^{i\phi(w)}$$

represent the phase characteristic of the entire system from input to output, then the transfer characteristic of the system, omitting the effect of the attenuator 21, is the expression $$\sqrt{q}\,RwCe^{i\phi(w)}$$

Assuming that a record trace is in reproducible form, this is the factor by which the events on the record are modified in passing through the system. If this same record is played through the system with the events occurring in the opposite sequence—that is in a reverse direction—the transfer function of the system is the same, but the phase characteristic of the resulting record is as if the transfer characteristic were the expression $$\sqrt{q}\,RwCe^{-i\phi(w)}$$

with respect to the record which results from a playback with events occurring in their normal time sequence.

This means that, if a given record trace is played through such a system twice, one time normally, or "forward," and one time in reverse, the total transfer characteristic is the product of the two separate ones and is given by $$\sqrt{q}\,RwCe^{i\phi(w)} \cdot \sqrt{q}\,RwCe^{-i\phi(w)}$$

and when this expression is combined, the phase characteristic disappears, giving the expression $qR^2w^2C^2$. If, on either the forward or the reverse playback of the record trace, the attenuator 21 is set to the value $$\frac{1}{n}$$

then this becomes equivalent to the factor $$\frac{Kw^2}{n}$$

if $q$, $R$, and $C$ are chosen to make $K = qR^2C^2$.

Referring now to Figure 2, this figure shows in block diagram form how the circuit of Figure 1 is incorporated in a complete system. As appears on the left of this figure and as is well known, a charge of explosive 30 is normally detonated in a shot hole to produce seismic waves which can be reflected by subsurface interfaces 31, 32, and 33 back to a seismic wave detector 34 at the ground surface. Frequently the time interval between receipt of the impulses from interfaces 31, 32, and 33 will be so small that these impulses overlap in the received wave forms, and it is accordingly the purpose of the present invention to contract the individual wavelets so that they may be separately identified and the depth to each of the three interfaces more accurately ascertained.

For this purpose the output of the detector 34 is transmitted to a recording unit 35 shown only in block diagram form but incorporating means for preserving in reproducible form not only the original signal from the seismometer 34 but also for playing back and re-recording that signal after modification in accordance with the invention.

The unit 35 further includes means by which the recorded trace can be moved past the reproducing device in a direction either the same as or opposite to the direction of movement past the recording head. In this way a forward or a reverse playback can be made of any recorded trace by a simple choice of direction of movement of the record-receiving medium. The recording and playback of the various traces are controlled by switches 36 and 37, and advantageously the adjusting means 38 of the attenuator 21 may be coupled with the switches 36 and 37 as indicated by the lines 39. Since the resistor 23 and condenser 22 perform the function of differentiating the input wave forms, they are denoted by the unit 40 in Figure 2. Also coupled by appropriate leads to the unit 35 is a summation recorder 41 by which selected traces can be combined for recording as a single resultant record trace.

The system thus described in outline is shown in greater detail and can be better understood by reference to Figure 3. The recording unit 35 preferably comprises a drum or the like 45 surfaced with a magnetic recording medium adjacent which are a plurality of spaced and aligned magnetic recording heads 46 numbered from 1 to 11, inclusive, adapted to record on the drum 45 correspondingly numbered magnetic traces. The drum 45 is driven by a constant speed electric motor 47 through a reversing gear 48 which may be manually or automatically actuated to drive the drum 45 in either a "forward" or a "reverse" direction, indicated by F and R adjacent the shift lever of device 48.

The attenuator adjustment means 38 may conveniently comprise a selector switch as shown in Figure 3, connected to various points of the attenuator resistor 21. Each of the three selector switches 36, 37, and 38, is preferably a twelve-position switch with the contact points respectively lettered from A to L, inclusive, for purposes of this explanation. The contact A of input selector 36 is connected to the output of a recording amplifier 51 actuated by the seismic signal source 34. The latter may be either the seismometer shown in Figure 2 or some means such as a magnetic recording reproducer playing back the previously-recorded trace of such a seismometer.

By a suitable lead the switch point A of selector 36 is connected to the recording head 1 adjacent the drum 45 for recording trace number 1. Points B, D, F, H, and J of selector 36 are respectively connected to recording heads 1, 3, 5, 7, and 9. The movable contactor arm of selector 36 is connected to the ungrounded end of attenuator resistor 21. The attenuation taps of resistor 21 respectively labeled 1, ½, ⅓, ¼, and ⅕ to denote the attenuation produced are connected to the contacts of selector 38 respectively lettered B, D, F, H, and J. The contacts C, E, G, I, and K of selector 38 are respectively connected directly to recording heads 2, 4, 6, 8, and 10. The movable contactor of the selector 38 is connected to an amplifier 52, the output of which is applied to the condenser 22 of differentiating network 40. The output of the amplifier 24 is connected to the movable contactor of selector switch 37. Contacts B through K of this selector 37 are respectively connected to recording heads 2 through 11 adjacent the drum 45. The contacts A and L of both selectors 37 and 38 are open. The switch position L of selector switch 36 is connected to the coil of a relay 53, of which the return lead includes a voltage source 54 connected to the lead from movable contactor 36. The relay coil 53 actuates the contactors of a multiple pole switch 55 which connects the odd-numbered recording heads 46 to the summation recorder 41.

The operation of this embodiment of the invention is as follows: Starting on the selector switch position A, the signal from source 34 amplified by 51 as required is recorded directly by the magnetic recording head 1 as trace 1 with the unit 48 operating in the "forward" direction. On switch position B, with unit 48 still in the "forward" direction, trace 1 is played back by the pickup unit 1 through the selector arm 36 and, without attenuation by resistor 21, is passed through selector arm 38 and amplifier 52 into the differentiator 40 and amplifier 24 to be recorded as the trace 2 by the recording head 2. It is the function of amplifier 52 to make up for the loss in voltage that occurs upon playing back each recorded trace, so that the reproduced voltage is equal to that applied to the recording head which produced the trace. On switch position C with the unit 48 in "reverse" position trace 2 is played back by direct connection to the switch arm 38 and is recorded as trace number 3. Trace 3 may therefore be regarded as a second playback of trace 1, the first being in a "forward" direction and the second in a "reverse" direction. Accordingly, phase distortion introduced by the first playback is canceled out by the second.

Similarly, on switch position D trace 3 is played back through the attenuator 21 set on the ½ position and recorded as trace 4. On switch position E trace 4 is played back without attenuation, with unit 48 reversed, and recorded as trace 5. Trace 5 may thus be regarded as the second playback of trace 3, once forward and once in reverse and multiplied by the factor ½ from the setting of attenuator 21. In the same way alternate forward and reverse playbacks of preceding traces are made, so that the odd-numbered traces recorded on drum 45 represent the respective series terms of the series expansion of $e^{Kw^2}$.

Upon reaching switch position L the voltage of source 54 closes the contacts 55 of relay 53, and a summation record of these odd-numbered traces is made by the recorder 41. The trace recorded by recorder 41 is thus the original signal trace with the wavelets therein contracted in approximately the same way as if amplified by an amplifier of the amplification characteristic $e^{Kw^2}$. The degree of accuracy is proportional to the number of the series terms approximated. The final wave form will have substantially zero phase distortion because of the forward and reverse playback steps preceding the making of each successive series-term trace, and accordingly one of the limitations of the prior-art systems is avoided.

The foregoing operation may be still better understood by the presentation of the following table wherein the exact operation performed by the embodiment of Figure 3 for each selector switch position is shown in detail.

| Switch Position | Drum Rotation | Trace Played Back | Trace Recorded | Attenuator Setting | Series Term(s) Produced |
|---|---|---|---|---|---|
| A | F | Signal | 1 |  | 1 |
| B | F | 1 | 2 | 1 | $\frac{Kw^2}{1}$ |
| C | R | 2 | 3 |  |  |
| D | F | 3 | 4 | ½ | $\frac{(Kw^2)^2}{1 \cdot 2}$ |
| E | R | 4 | 5 |  |  |
| F | F | 5 | 6 | ⅓ | $\frac{(Kw^2)^3}{1 \cdot 2 \cdot 3}$ |
| G | R | 6 | 7 |  |  |
| H | F | 7 | 8 | ¼ | $\frac{(Kw^2)^4}{1 \cdot 2 \cdot 3 \cdot 4}$ |
| I | R | 8 | 9 |  |  |
| J | F | 9 | 10 | ⅕ | $\frac{(Kw^2)^5}{1 \cdot 2 \cdot 3 \cdot 4 \cdot 5}$ |
| K | R | 10 | 11 |  |  |
| L | F | 1+3+5+7+9+11 | Summation |  | Signal × $(1+Kw^2+\cdots)$ |

This table thus presents in brief summarized fashion the operation performed and results achieved at each step of the operation of the selector switches 36, 37, and 38. While for illustrative purposes only six of the series terms have been shown, it is to be understood that any greater or less number of such terms may be approximated in the same manner as those discussed.

The exact order of operation of the reversing means 48 can differ from that shown in the table in several ways. It is perhaps simplest to think of the playbacks as being made in pairs, beginning with the playback of original trace 1. Traces 2 and 3 thus constitute the first pair of playback traces, traces 4 and 5 the second pair, and so on. The important point is that each pair of playbacks shall have one forward and one reverse playback, and it is immaterial which is first and which is second. Regardless of the order, the second playback of each pair is the one with phase shifts canceled out, and represents the series term for summation.

The factor $1\sqrt{n}$ introduced by the setting of attenuator 21 on one playback of each pair can of course be applied to both playbacks of the pair as the factor $1\sqrt{n}$ if preferred.

Before considering a numerical example, the exact relations between the K of $e^{Kw^2}$, the wavelet breadth $b$, and the contraction to be produced should be shown. In the notation used by Ricker the contractor characteristic is $$e^{+\frac{f^2}{f_a^2}}$$

This can be rewritten as $$e^{+\frac{(2\pi f)^2}{(2\pi f_a)^2}}$$

which is the same as $$e^{\frac{w^2}{4\pi^2 f_a^2}}$$

since the relation between frequencies in cycles $f$ and in radians $w$ per second is $w = 2\pi f$. Thus, the exponential $e^{Kw^2}$ describes the characteristic of a wavelet contractor if $$K = \frac{1}{4\pi^2 f_a^2}$$

By Equation 25 of Ricker the relation between wavelet breadth $b$ and corresponding peak spectral frequency $f_1$ is stated as $$f_1 = \frac{\sqrt{6}}{\pi} \cdot \frac{1}{b}, \text{ or } \frac{1}{f_1} = \frac{\pi}{\sqrt{6}} \cdot b$$

Therefore, the relation between the apparatus frequency constant $f_a$ and the apparatus breadth constant $b_a$ must be $$\frac{1}{f_a} = \frac{\pi b_a}{\sqrt{6}}$$

Squaring this gives $$\frac{1}{f_a^2} = \frac{\pi^2 b_a^2}{6}$$

But Ricker's Equation 29 states, in rewritten form, that $$b_a^2 = b_1^2 - b_2^2$$

where $b_1$ and $b_2$ are the breadths in seconds of the initial and the contracted wavelets, respectively. Therefore, substituting for $b_a^2$ $$\frac{1}{f_a^2} = \frac{\pi^2}{6}(b_1^2 - b_2^2)$$

and substituting this, in turn, into the equation relating K and $f_a$ $$K = \frac{b_1^2 - b_2^2}{24}$$

Taking as a numerical example, the contraction of a 20 millisecond wavelet into a 10 millisecond wavelet, the value of K is required to be:

$$K = \frac{(20 \times 10^{-3})^2 - (10 \times 10^{-3})^2}{24} = \frac{300 \times 10^{-6}}{24} = \frac{10^{-4}}{8}$$

This is the value of K which must be approximated by properly choosing $q$, R, and C in the differentiator 40 and amplifier 24. That is, for this example, the relation to be satisfied is $$qR^2C^2 = K = \frac{10^{-4}}{8}$$

If C is 1 microfarad ($10^{-6}$) and R is 100 ohms ($10^2$), then RC is $10^{-4}$ and $R^2C^2$ is $10^{-8}$. The value of $q$ to satisfy this equation is $10^4/8$, which means that $\sqrt{q}$, the gain required of amplifier 24, is about 35.

In the discussion of Figure 1 it was necessary to assume that the quantity $RwC$ was small with respect to unity over the entire usable frequency range. In terms of the above numerical values for R and C this means that the angular frequency $w$ is much smaller than $10^4$ or, in terms of cycles per second $f$, the usable frequency range is far below 1600 cycles per second. In view of the fact that the peak frequency of a 10 millisecond wavelet is in the region of 100 cycles per second, this is not a serious limitation.

When combined with the loss introduced by the differentiator 40, the net or effective gain of the differentiator and amplifier 24 in each pair of playbacks forming a complete forward-reverse playback cycle is the expression $Kw^2$. For a frequency of 100 cycles this gain is about 5, so that after the first five complete forward-reverse playback cycles required to produce the sixth term of the series expansion, the total gain is only about $5^5/120$, or about 26, allowing for the effect of attenuator 21.

For 150 cycles frequency the corresponding gain factor is only about 140, while for 200 cycles frequency it is about 25,000. As all of these gain factors are entirely reasonable and readily achieved without excessive interference from system noises, it is believed apparent that substantial degrees of wavelet contraction can be achieved in the manner described.

While the description has presented a specific numerical example and shown the approximation of the first six series terms, it is to be understood that these are illustrative only and that any greater or lesser number of the series terms can be similarly approximated, and other values of the circuit constants can be used. The scope of the invention, therefore, should not be considered as limited to the examples described, but it is properly to be ascertained by reference to the appended claims.

I claim:

1. The method of contracting seismic wavelets contained in a seismic geophysical data trace recorded in phonographically reproducible form, which method comprises the step of making a plurality of pairs of playbacks starting with said trace; each of said playbacks comprising reproducing the last prior recorded trace as a corresponding electric wave, passing said electric wave successively through an attenuator, a differentiator, and a flat-response amplifier having constants chosen to represent K and successive values of $1/n$ in the infinite series expansion $$e^{Kw^2} = 1 + Kw^2 + \frac{(Kw^2)^2}{2!} + \cdots + \frac{(Kw^2)^n}{n!} + \cdots$$

where $w$ is frequency in radians per second, and recording the resultant electric wave as a new phonographically reproducible trace; said playback pairs each consisting of one forward and one reverse playback in which the events of the electric wave occur in sequences respectively the same as and opposite to the sequence of the corresponding seismic events in time; and the step of recording a final trace representing the sum of said data trace plus all of the traces recorded during the second playback of each pair of playbacks.

2. In seismic geophysical surveying, the steps which comprise generating seismic waves at a given location; receiving said waves at a location spaced from said given location after travel through the earth's subsurface; recording the received waves as a first phonographically reproducible trace; making a plurality of pairs of playbacks starting with said first trace, each of said playbacks comprising reproducing the last prior recorded trace as a corresponding electric wave, passing said electric wave through an attenuator, a differentiator, and a flat-frequency-response amplifier, the setting of said attenuator, the time constant of said differentiator and the gain of said amplifier all being chosen to represent K and the successive values of $1/n$ in the infinite series expansion of $$e^{Kw^2} = 1 + Kw^2 + \frac{(Kw^2)^2}{2!} + \cdots + \frac{(Kw^2)^n}{n!} + \cdots$$

where $w$ is frequency in radians per second, and recording the resultant electric wave as a new phonographically reproducible trace; one playback of each pair of playbacks being a forward playback in which the events in the electric wave occur in the same order as the corresponding seismic events occur in time, and the other playback of said each pair being a reverse playback in which the events in the electric wave occur in the opposite order to the occurrence of the corresponding seismic events in time; and recording a final trace representing the sum of said first trace and every second new reproducible trace recorded thereafter.

3. A system for contracting seismic wavelets, said system having a response characteristic approximating the exponential $e^{Kw^2}$ by approximating and adding together a number of terms of the infinite series expansion for $$e^{Kw^2} = 1 + Kw^2 + \frac{(Kw^2)^2}{2!} + \cdots + \frac{(Kw^2)^n}{n!} + \cdots$$

in which K represents the degree of contraction and $w$ is frequency in radians per second, said system comprising a record-receiving medium bearing a seismic signal trace in phonographically reproducible form; a plurality of transducers adjacent said medium for recording electric signals thereon in phonographically reproducible trace form and for reproducing traces recorded thereon as corresponding electric signals; a playback loop connected from one of said transducers acting as a reproducer to another of said transducers acting as a recorder, said loop comprising an attenuator, a differentiator, and a flat-frequency-response amplifier connected in series, the adjustment of said attenuator and the constants of said differentiator and amplifier being chosen to approximate the desired value of K and successive values of $1/n$ in the various terms of said series expansion; means for producing relative motion between said medium and said transducers to reproduce any given trace and to record the resulting electric signal of said playback loop as a new trace parallel to said given trace; means for shifting the effective positions of said reproducing and said recording transducers across said medium so that the recorded trace of one playback becomes the reproduced trace of the next succeeding playback, the first playback being of said seismic signal trace; means for reversing the direction of said relative motion between the two playbacks of each pair, every two playbacks starting with and following said first playback constituting a pair of playbacks; and means actuated by said transducers for recording a final trace representing the sum of said seismic signal trace plus all traces recorded during the second playback of all pairs of playbacks.

References Cited in the file of this patent

UNITED STATES PATENTS

| | | |
|---|---|---|
| 2,351,456 | Ricker | June 13, 1944 |
| 2,672,944 | Minton | Mar. 23, 1954 |